(12) United States Patent
Ma et al.

(10) Patent No.: US 9,794,383 B2
(45) Date of Patent: Oct. 17, 2017

(54) TRI-PROOF STRUCTURE AND MOBILE PHONE USING THE SAME

(71) Applicant: Power Idea Technology (Shenzhen) Co., Ltd., Shenzhen (CN)

(72) Inventors: Ji-Dong Ma, Shenzhen (CN); Dong-Ming Chen, Shenzhen (CN)

(73) Assignee: Power Idea Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/262,010

(22) Filed: Sep. 12, 2016

(65) Prior Publication Data

US 2016/0381193 A1 Dec. 29, 2016

(30) Foreign Application Priority Data

Jan. 10, 2014 (CN) .......................... 2014 1 0011754

(51) Int. Cl.
*H04B 1/38* (2015.01)
*H04M 1/02* (2006.01)
*H04B 1/3888* (2015.01)

(52) U.S. Cl.
CPC ........ *H04M 1/0249* (2013.01); *H04B 1/3888* (2013.01)

(58) Field of Classification Search
CPC ........................... H04M 1/0249; H04B 1/3888
USPC ............................... 455/90.3, 347, 73, 550.1
See application file for complete search history.

(56) References Cited

U.S. PATENT DOCUMENTS

| | | | |
|---|---|---|---|
| 8,164,899 B2 * | 4/2012 | Yamaguchi ........... | G06F 1/1616 220/4.21 |
| 8,942,773 B2 * | 1/2015 | Wu ........................ | A45C 11/00 206/320 |
| 9,264,089 B2 * | 2/2016 | Tages .................... | H04M 1/185 |
| 9,444,506 B2 * | 9/2016 | Lai ........................ | H04B 1/3888 |
| 2011/0024315 A1 * | 2/2011 | Kim ........................ | H04M 1/18 206/320 |
| 2014/0220270 A1 * | 8/2014 | Hung .................... | H04M 1/185 428/34.1 |
| 2017/0019512 A1 * | 1/2017 | Guerdrum ........... | H04M 1/0264 |
| 2017/0063421 A1 * | 3/2017 | Moon ................... | H04B 1/3888 |

FOREIGN PATENT DOCUMENTS

| | | |
|---|---|---|
| CN | 101522006 B | 9/2011 |
| CN | 103082619 A | 5/2013 |

* cited by examiner

*Primary Examiner* — Sonny Trinh
(74) *Attorney, Agent, or Firm* — Steven Reiss (57) ABSTRACT

A mobile phone proofed against water, dust, and physical shocks (tri-proofed) has a structure comprising a first casing, a second casing, and a third casing. The first casing is provided with protrusions, and the third casing is provided with convex blocks. The second casing is provided with a first groove for a protrusion, and is provided with a second groove for a convex block. The protrusions and the convex blocks are both interference fits in the grooves. Moreover, the second casing also includes cosmetic surfaces. The first casing and the third casing have outer surfaces and each cosmetic surface protrudes out of the outer surfaces. The cosmetic surfaces are in first contact when the mobile phone is dropped. Waterproofing, dustproofing, and shockproofing are simultaneously achieved with the single second casing structure.

18 Claims, 9 Drawing Sheets

TRI-PROOF STRUCTURE AND MOBILE PHONE USING THE SAME

FIELD

The subject matter herein generally relates to a tri-proof structure, and a mobile phone using the same.

BACKGROUND

Products which are tri-proof (waterproof, dustproof, and shockproof) are desirable. A conventional tri-proof structure usually include a first casing, a waterproof rubber ring, and a second casing. The first casing is provided with a first soft rubber. The first soft rubber and the first casing are double-color molded. The second casing is provided with a second soft rubber. The second soft rubber and the second casing are also double-color molded. The first soft rubber and the second soft rubber cooperatively form a soft rubber surface, the soft rubber surface provides a buffer and shockproof effect. Simultaneously, the second casing further defines a groove, the waterproof rubber ring is assembled in the groove. The first casing presses on the waterproof rubber ring and is assembled together with the second casing via a fixing member. In the aforementioned structure, the first soft rubber and the first casing are double-color molded, and the second soft rubber and the second casing are double-color molded. A structure of the mold is complex, a cost of the mold manufacture is high, and a precision requirement to the molding machine is high, thus the manufacturing cost of a mobile phone is increased. In addition, because of the sole complete circle structure and a small cross-section area of the waterproof structure, during the process of assembling the waterproof structure to the groove, the operation is inconvenient, and the assembly has an inferior consistency and a structural bias. Thus the waterproof effect is affected. In an aspect of the waterproof and sealing effect, the waterproof effect of the structure mainly depends on a degree of pressure and sealing between the waterproof rubber ring and the first casing and between the waterproof rubber ring and the second casing. Moreover, the waterproof rubber ring has manufacturing tolerances and assembly biases, thus a larger interference value is required to ensure the waterproof effect. A greater locking force is accordingly required between the first casing and the second casing and a larger casing strength is accordingly required. In addition, there exists an assembly line after the assembly of the first casing soft rubber and the second casing soft rubber, which can affect the aesthetic appearance of the product. Simultaneously, the first casing soft rubber and the second casing soft rubber only provide a buffer and shockproof effect, and the waterproof rubber ring only provides a waterproof and dustproof effect, all must be used simultaneously to achieve a tri-proof effect.

SUMMARY OF THE INVENTION

An object of the present disclosure is to provide a tri-proof structure. The structure with a tri-proof effect reduces a production manufacturing cost of the product, and reduces an assembly difficulty. In the present disclosure, the assembly consistency is better and the tri-proof effects are more reliable.

Preferably, the present disclosure employs two kinds of tri-proof structures on a single structure. Tri-proof requirements at different structural positions are presented, thus the application of the present disclosure is wider and more flexible.

Another object of the present disclosure is to provide a mobile phone using the same. The manufacturing cost of the mobile phone is decreased and the assembly efficiency is improved.

A tri-proof structure includes a first casing, a second casing, and a third casing. The first casing is provided with a protrusion. The third casing is provided with a convex block. The second casing is made of soft material. The second casing defines a first groove corresponding to the protrusion of the first casing and defines a second groove corresponding to the convex block of the third casing. The protrusion and the first groove, and the convex block and the second groove are both interference fittings. The first casing and the third casing are both assembled to the second casing. The second casing further includes a cosmetic surface. The first casing and the third casing each further include an outer surface. The cosmetic surface protrudes out of the outer surfaces of the first casing and the third casing.

Preferably, the third casing further includes opposite upper and lower ends. The opposite upper and lower ends employs another waterproof structure. The opposite upper and lower ends each define a concavity. The second casing also includes another opposite upper and lower ends. The other opposite upper and lower ends each is a strip structure. Each strip structure is received in one concavity and is an interference fit with the first casing in assembly together with the first casing.

A mobile phone using the same is provided.

The groove of the second casing is an interference fit with the protrusion of the first casing and is an interference fit with the convex block of the third casing. Thus the present disclosure can efficiently achieve a waterproof and dustproof effect between the second casing and the first casing and between the second casing and the third casing. The second casing is made of soft material and is protruded out of the outer surface of the first casing and the third casing, thus the second casing provides a buffer and shockproof effect. The present disclosure employs a single structure and simultaneously achieves a tri-proof effect. In addition, the first casing, the second casing, and the third casing are made of one material, which does not need double-color molding and thus saves molding production cost. A common sole color molding machine can satisfy the production requirement, thereby decreasing a production manufacturing cost of the product. In the assembly process, because of the groove defined at the second casing, the third casing and the second casing, and the first casing and the second casing, are assembled in a plug or socket manner. As compared to the related art of providing a complete circle waterproof soft rubber with a small cross-section area, the operation process of the present disclosure is simpler and more reliable. Simultaneously, the second casing is made of soft material, the first casing, the second casing, and the third casing are interference fits and tightly joined after assembling, there is not a gap between the first casing, the second casing, and the third casing. Moreover, the plug or socket assembly employs a certain depth of plugging. Therefore, as compared to the related art of a mere press fit between the first casing and the second casing, the waterproof and dustproof effects of the present disclosure are more reliable.

Furthermore, because the size of the ends of the casing is small and the present disclosure employs a concave third casing and a strip second casing, the present disclosure achieves a better waterproof effect in a defined space.

BRIEF DESCRIPTION OF THE DRAWINGS

Implementations of the present technology will now be described, by way of example only, with reference to the attached figures, wherein.

DETAILED DESCRIPTION

The present disclosure and mobile phone are to be understood in conjunction with the accompanying drawings and specific embodiments herein.

Figure 1:
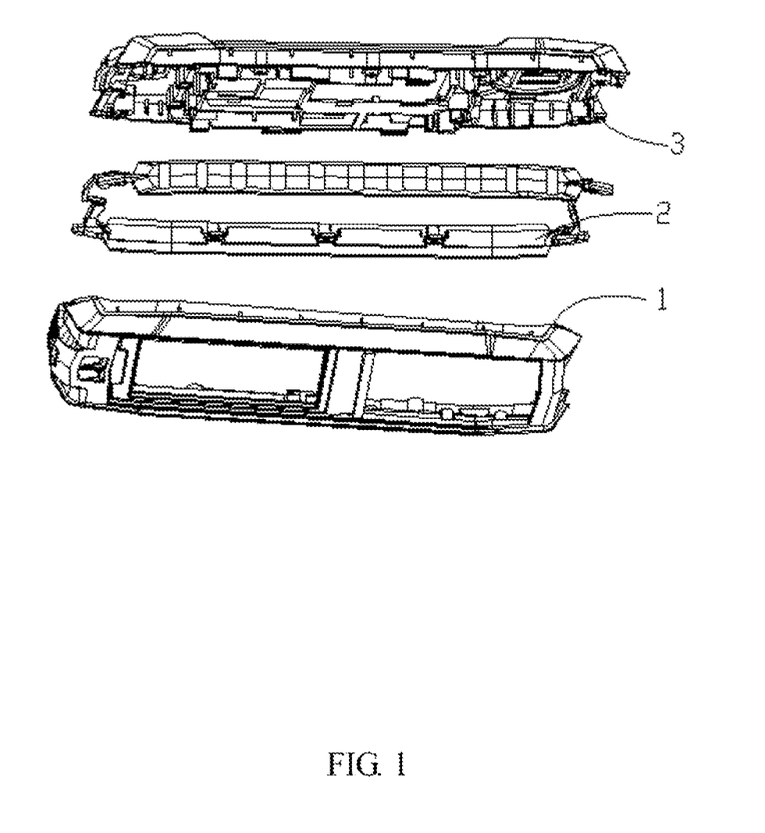
FIG. 1 illustrates an exploded view of an embodiment of a tri-proof structure.
Figure 2:
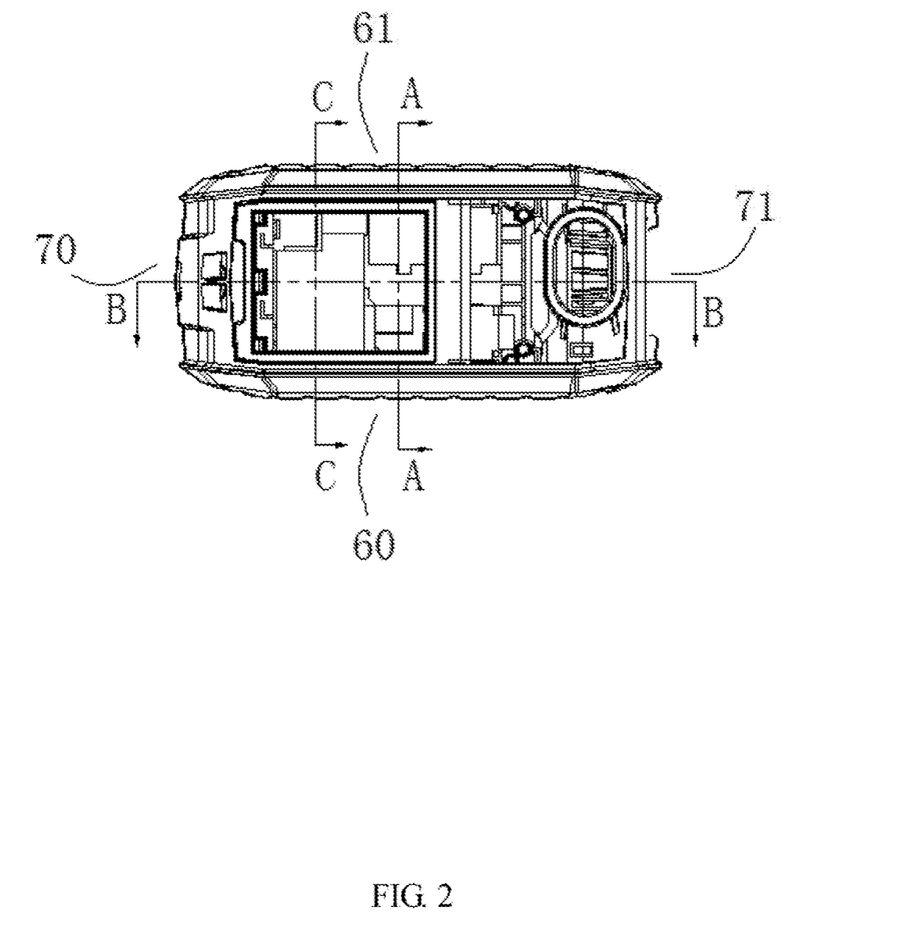
FIG. 2 illustrates an assembly view of the structure of FIG. 1.

Referring to FIGS. 1-2, a tri-proof structure for a mobile phone is shown. The mobile phone includes a first casing 1, a second casing 2, and a third casing 3. The first casing 1 and the third casing 3 are both assembled to the second casing 2, and are assembled together via a fixing member. The tri-proof structure for the mobile phone includes a tri-proof structure for opposite left and right sides 60, 61 and a tri-proof structure for opposite upper and lower ends 70, 71. The waterproof structures that the opposite left and right sides 60, 61 and the opposite upper and lower ends 70, 71 employ are different. Thus a problem that the spaces of the opposite left and right sides 60, 61 are sufficient but the spaces of the opposite upper and lower sides 70, 71 are limited are resolved.

Figure 3:
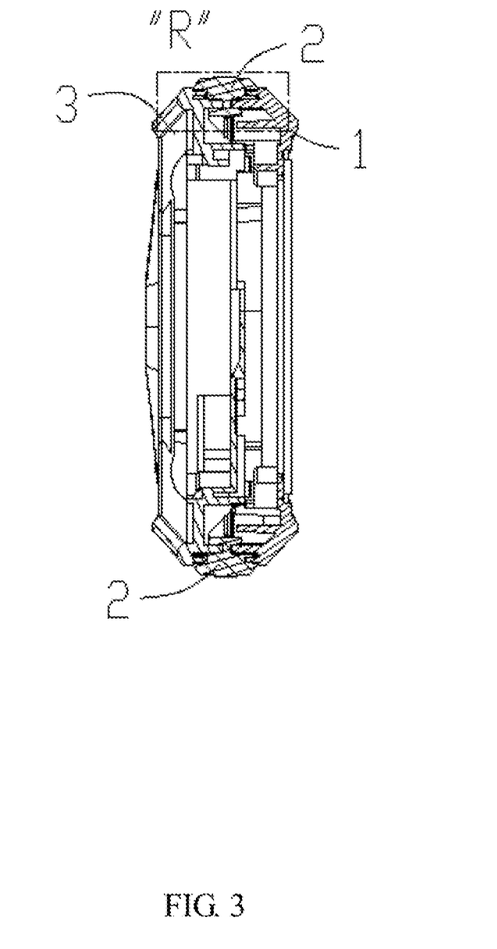
FIG. 3 illustrates a cross-sectional view taken along line A-A of FIG. 2.
Figure 4:
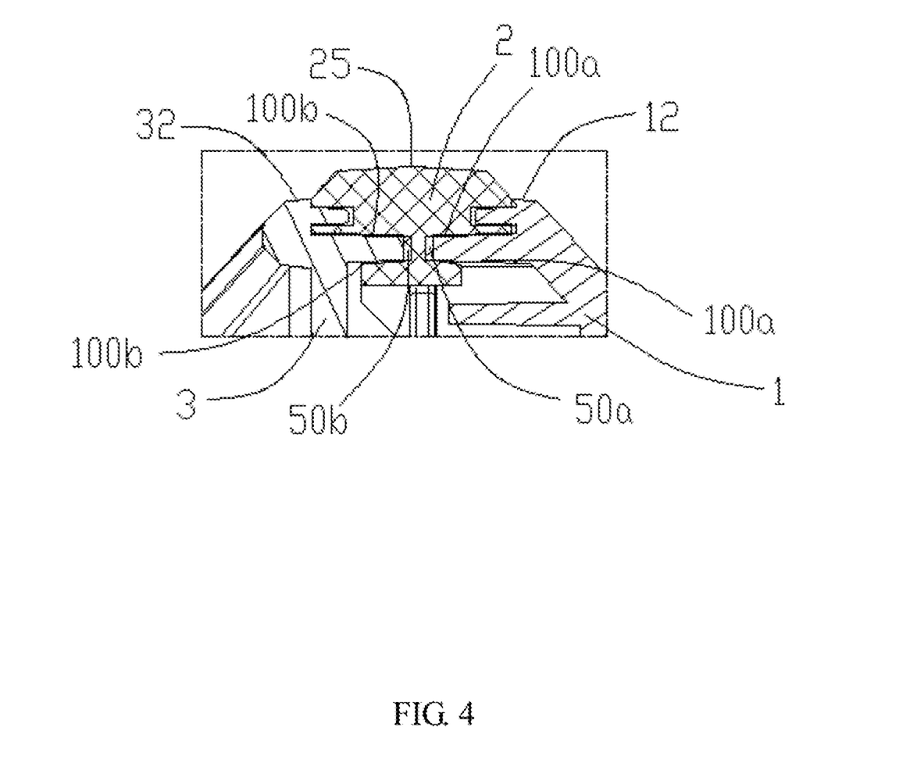
FIG. 4 illustrates an enlarged view of a portion "R" of FIG. 3.
Figure 5:
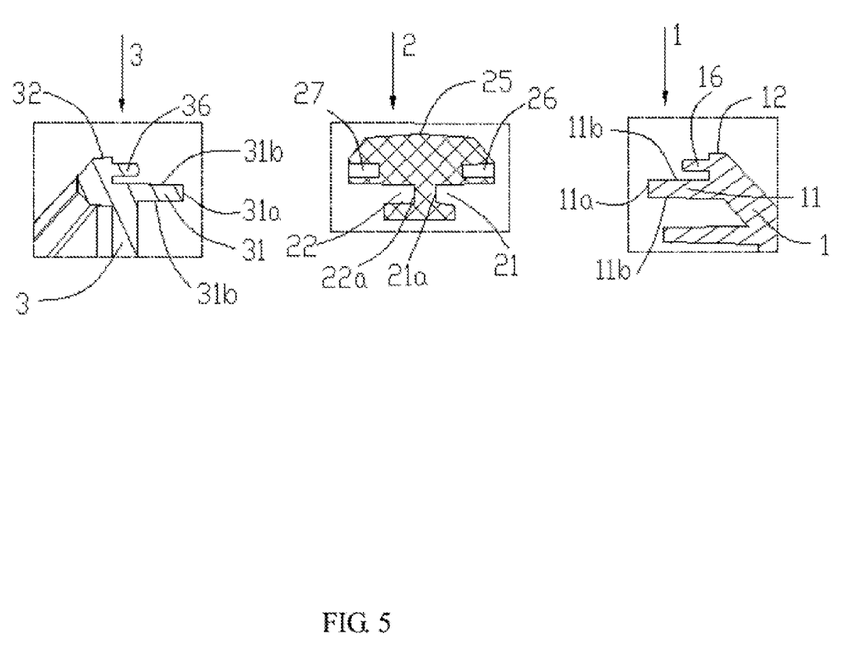
FIG. 5 illustrates an exploded view of portion "R" of FIG. 4.

Referring to FIGS. 3-5, the tri-proof structure for the opposite left and right sides 60, 61 is shown. The first casing 1 is provided with a protrusion 11 at each of the opposite left and right sides of the first casing. Each protrusion 11 includes a first top surface 11a. The third casing 3 is provided with a convex block 31 at each of the opposite left and right sides of the third casing 3. Each convex block 31 includes a second top surface 31a. The second casing 2 is made of soft material, and defines a first groove 21 corresponding to each protrusion 11 of the first casing 1 and a second groove 22 corresponding to each convex block 31 of the third casing 3. Each first groove 21 includes a first bottom surface 21a, and each second groove 22 includes a second bottom surface 22a. The fit between each first top surface 11a and the corresponding first bottom surface 21a and the fit between each second top surface 31a and the corresponding second bottom surface 22a are interference fit 50a and interference fit 50b correspondingly. The interference fits ensure a waterproof and dustproof effect between the first casing 1 and the second casing 2, and between the second casing 2 and the third casing 3. Preferably, each protrusion 11 further includes two opposite first sidewalls 11b. A gap 100a is provided between each first sidewall 11b and a corresponding first groove 21. Each convex block 31 also includes two opposite second sidewalls 31b. Similarly, a gap 100b is also provided between each second sidewall 31b and a corresponding second groove 22. Thus, the assembly of the protrusions 11 to the first grooves 21 and the assembly of the convex blocks 31 to the second grooves 22 is convenient and employ a "plug-in" process. Simultaneously, the gaps 100a and 100b respectively provide a space for deformation in relation to interference fits 50a and 50b. Deformation is more reliable, which improves the waterproof and dustproof effects. Simultaneously, the second casing 2 further includes a cosmetic surface 25 at each of the opposite left and right sides of the second casing 2. The first casing 1 and the third casing 3 respectively further include an outer surface 12 and an outer surface 32 at each of the opposite left and right sides of the third casing. Each outer surface 12 and a corresponding outer surface 32 are substantially located on a same plane. Each cosmetic surface 25 protrudes out of the plane formed by the corresponding outer surfaces 12 and 32 after assembly, simultaneously a partial structure of the second casing 2 at each cosmetic surface 25 wraps around the corresponding outer surfaces 12 and 32 for a better joint between the first casing 1 and the second casing 2, and between the second casing 2 and the third casing 3. The cosmetic surfaces 25 of the second casing 2 are firstly in contact when dropping, thereby resolving the shockproof problem efficiently. Simultaneously, an anti-skid structure is provided on each cosmetic surface 25 and provides a better feel for users.

Preferably, the position of each protrusion 11 of the first casing 1 and the position of the corresponding convex block 31 of the third casing 3 are opposite to each other. The position of each first groove 21 and the position of the corresponding second groove 22 are opposite to each other rather than in a staggered configuration. A divider is further provided between each first groove 21 and the corresponding second groove 22. Each protrusion 11 and the corresponding convex block 31 cooperatively push against the divider. Thus, the protrusions 11 and the convex blocks 31 support each other, and the deformation of the divider is more efficient.

The first casing 1 is further provided with at least four first positioning columns 16. The second casing 2 is provided with a number of first positioning holes 26. The number of the first positioning holes 26 is the same as the number of the first positioning columns 16. The position of each first positioning column 16 is opposite to the position of one corresponding first positioning hole 26. Moreover, the assembly of the first positioning columns 16 and the first positioning holes 26 provide positioning for the assembly of the first casing 1 and the second casing 2 together. Preferably, the third casing 3 is further provided with at least four in number of the second positioning columns 36. The second casing 2 is also provided with the same number of second positioning holes 27. The position of each second positioning column 36 is opposite to the position of one corresponding second positioning hole 27. Moreover, the assembly of the second positioning columns 36 and the second positioning holes 27 provide positioning for the assembly of the second casing 2 and the third casing 3 together.

Figure 6:
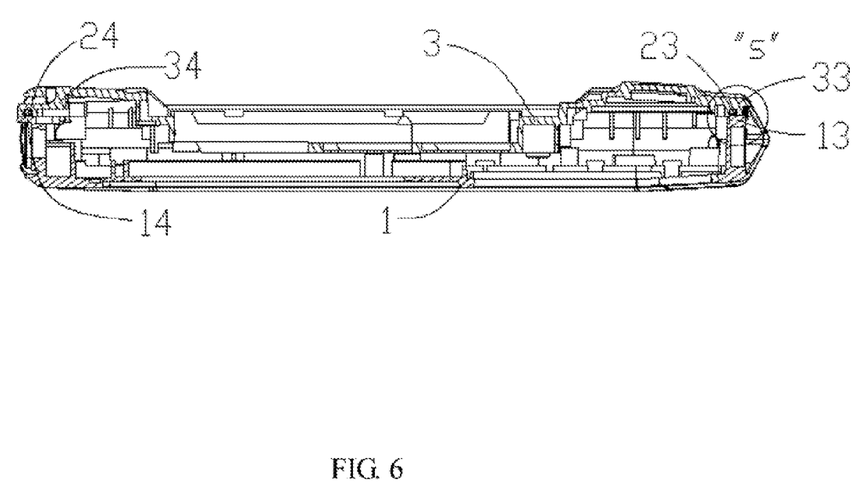
FIG. 6 illustrates a cross-sectional view taken along line B-B of FIG. 2.
Figure 7:
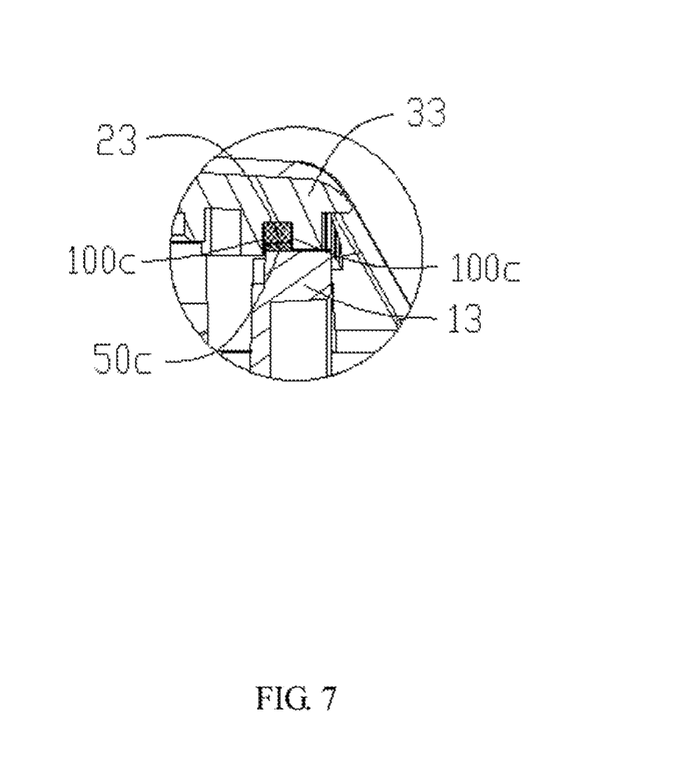
FIG. 7 illustrates an enlarged view of a portion "S" of FIG. 6.
Figure 8:
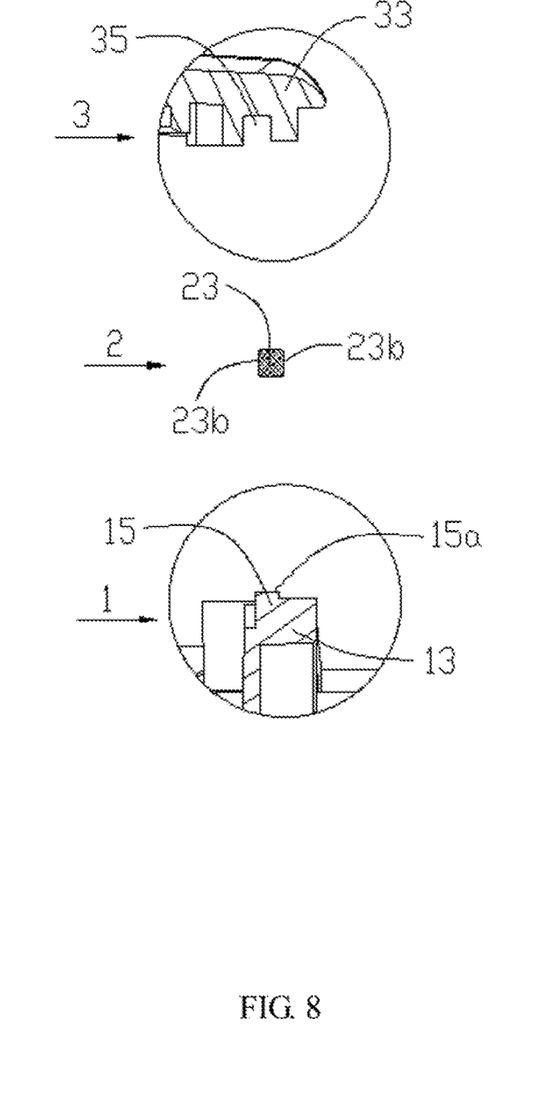
FIG. 8 illustrates an exploded view of portion "S" of FIG. 7.

Referring to FIGS. 6-8, a tri-proof structure for the opposite upper and lower ends 70, 71 is shown. The third casing 3 further includes opposite upper and lower ends 33, 34. The opposite upper and lower ends 33, 34 each defines a concavity 35. The second casing 2 also includes other opposite upper and lower ends 23, 24. The other opposite upper and lower ends 23, 24 are each a strip structure. Each strip structure is assembled in a concavity 35 and is interference fitted with the first casing 1 during further assembly. The interference fit ensures effective waterproofing and dustproofing between the opposite upper and lower ends of the first casing 1 and the second casing 2 and between the opposite upper and lower ends of the second casing 2 and the third casing 3. Moreover, the first casing 1 also includes opposite upper and lower ends structures 13, 14. The opposite upper and lower ends structures 13, 14 are each provided with a protruding strip 15. Each protruding strip 15 is assembled in a concavity 35 and presses the strip structure 23 or the strip structure 24 to form an interference fit. The assembly of the protruding strips 15 in the concavities 35 sufficiently ensures the pressuring and reliable deformation of the strip structures 23, 24, thus the waterproof and dustproof effect is improved. Each protruding strip 15 further includes a top surface 15*a*. Each of the strip structures 23, 24 includes two opposite sidewalls 23*b*. The top surface 15*a* of each protruding strip 15 and each of the strip structures 23, 24 constitutes interference fit 50*c*. A gap 100*c* is provided between each of the two opposite sidewalls 23*b* and the concavity 35. Thus, assembly of each of the strip structures 23, 24 and the concavity 35 is easy and convenient.

Figure 9:
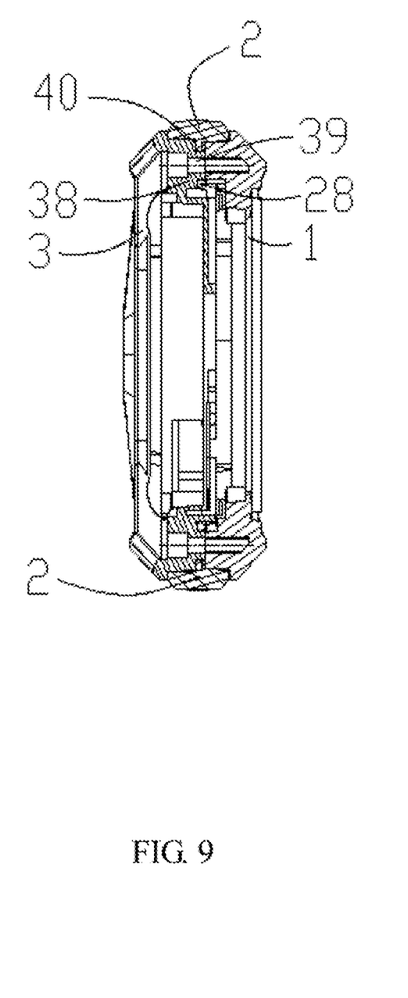
FIG. 9 illustrates a cross-sectional view taken along line C-C of FIG. 2.

Referring to FIG. 9, the third casing 3 is further provided with at least four protruding cylindrical columns 38. Each cylindrical column 38 defines a bolt hole. Each cylindrical column 38 further includes an annular step 40. The second casing 2 is provided with the same number of circular rings 28 as there are cylindrical columns 38. The respective positions of the circular rings 28 corresponds to the positions of the cylindrical columns 38. Each circular ring 28 is sleeved on an annular step 40. The first casing 1 is provided with screw holes, in positions corresponding to the positions of the bolt holes. The screw holes are the same in number as the number of the bolt holes. The third casing 3, the second casing 2, and the first casing 1 are assembled and held together via bolts.

In any particular embodiment, the tri-proof structure of the present disclosure mainly employs the second casing made of soft material to simultaneously achieve the tri-proof effect, reducing the production cost of the product. Simultaneously the tri-proof structure of the present disclosure provides sufficient space for the elastic deformation generated by the interference fit, thus the deformation is ensured to be reliable. Convenience in assembly is paramount in the tri-proof structure of the present disclosure, thus the production efficiency is improved. Moreover, the present disclosure further provides a new tri-proof design idea, namely two kinds of tri-proof structures are combined and applied in one tri-proofed product.

In the present disclosure, the interference fits 50*a*, 50*b*, and 50*c* form the waterproof and dustproof structure. The second casing 2 is made of soft material and is protruded out of the outer surfaces of the first casing 1 and the third casing 3. The second casing made of soft material is in first contact when the mobile phone is dropped, thus the second casing provides a buffer and shockproof effect. The present disclosure employs a single second casing structure to simultaneously achieve a tri-proof effect. Simultaneously, the first casing 1, the second casing 2, and the third casing 3 are each made of a single material, which avoids double-color molding. A common single color molding machine can satisfy the production requirement, thereby decreasing a production manufacturing cost of the product. In the assembly process, because of the gaps 100*a*, 100*b*, and 100*c*, the assembly is convenient and can be completed in a "plug-in" manner. As compared to the related art of providing a complete circle waterproof soft rubber with a small cross-section, the operation process of the present disclosure is simpler and more reliable. In addition, the interference fits 50*a*, 50*b*, and 50*c* operate to a certain plug depth when being plugged together. Therefore, the first casing, the second casing, and the third casing of the present disclosure are interference fits and held together tightly after assembling, and there is no gap. Compared to the related art of a mere press fitting between the first casing and the second casing, the waterproof and dustproof effect of the present disclosure is more reliable. Moreover, the present disclosure further provides a new tri-proofing design idea, namely two kinds of tri-proofing structures are combined and applied in one tri-proofed product. When there is sufficient space, the tri-proof structure for the opposite left and right sides of the present disclosure is employed. When the space is limited, the tri-proof structure for the opposite upper and lower ends of the present disclosure is employed.

The above is a detailed description with the accompanying drawings of a tri-proof structure and a mobile phone using the tri-proof structure. The ideas of the present disclosure are not limited to the field of mobile phones, for example, any waterproofing requirement between casings can use the ideas of the present disclosure to change and develop. In addition, the combination of two kinds of tri-proof structures in one device of the present disclosure can further be developed to even more types of tri-proof structures.

What is claimed is:

1. A mobile phone comprising:
    a first casing;
    a second casing made of soft material, the first casing being assembled to the second casing;
    a third casing assembled to the second casing;
    a first tri-proof structure for opposite left and right sides provided at opposite left and right sides of the mobile phone, the first tri-proof structure for the opposite left and right sides providing a protrusion at each of the opposite left and right sides of the first casing, providing a convex block at each of the opposite left and right sides of the third casing, and providing a first groove corresponding to each of the protrusions and a second groove corresponding to each of the convex blocks, the fits between the protrusions and the first grooves and the fits between the convex blocks and the second grooves each being interference fit;
    a second tri-proof structure for opposite upper and lower ends provided at the opposite upper and lower ends of the mobile phone, the second tri-proof structure for the opposite upper and lower ends providing a concavity at each of opposite upper and lower ends of the third casing, providing a strip structure assembled in each of the concavities at each of the opposite upper and lower ends of the second casing, and providing a protruding strip at each of the opposite upper and lower ends of the first casing, each of the protruding strips being assembled in one of the concavities and pressing one of the strip structures to form an interference fit;
    wherein the second casing further comprises a cosmetic surface at each of the opposite left and right sides of the mobile phone, the first casing and the third casing respectively further comprises an outer surface at each of the opposite left and right sides of the mobile phone, each of the cosmetic surfaces protrudes out of the corresponding outer surface of the first casing and the third casing.

2. The mobile phone as described in claim 1, wherein:
each of the protruding strips further comprises a top surface, each of the strip structures further comprises two opposite sidewalls, the top surface of each protruding strip and the corresponding strip structure are interference fit, and a gap is provided between each of the two opposite sidewalls and the corresponding concavity.

3. The mobile phone as described in claim 2, wherein:
the first casing and the second casing are further respectively provided with at least four first positioning columns and at least four second positioning columns at opposite left and right sides of the mobile phone, the second casing is provided with a plurality of first positioning holes corresponding to the first positioning columns and a plurality of second positioning holes corresponding to the second positioning columns, each of the first positioning columns is assembled together with a corresponding one of the first positioning holes, and simultaneously each of the second positioning columns is assembled together with a corresponding one of the second positioning holes.

4. The mobile phone as described in claim 3, wherein:
the third casing is further provided with at least four protruding cylindrical columns at opposite left and right sides of the mobile phone, each of the cylindrical columns defines a bolt hole, each of the cylindrical columns further comprises an annular step, the second casing is provided with a plurality of circular rings whose number is the same as the number of the cylindrical columns and whose positions are corresponding to the positions of the cylindrical columns, each of the circular rings is sleeved on a corresponding one of the annular steps, the first casing is provided with screw holes whose positions are corresponding to the positions of the bolt holes and whose number is the same as the number of the holt holes, the third casing, the second casing, and the first casing are assembled and held together via bolts.

5. The mobile phone as described in claim 1, wherein:
an anti-skid structure is provided on each of the cosmetic surfaces of the second casing.

6. The mobile phone as described in claim 5, wherein:
the first casing and the second casing are further respectively provided with at least four first positioning columns and at least four second positioning columns at opposite left and right sides of the mobile phone, the second casing is provided with a plurality of first positioning holes corresponding to the first positioning columns and a plurality of second positioning holes corresponding to the second positioning columns, each of the first positioning columns is assembled together with a corresponding one of the first positioning holes, and simultaneously each of the second positioning columns is assembled together with a corresponding one of the second positioning holes.

7. The mobile phone as described in claim 6, wherein:
the third casing is further provided with at least four protruding cylindrical columns at opposite left and right sides of the mobile phone, each of the cylindrical columns defines a bolt hole, each of the cylindrical columns further comprises an annular step, the second casing is provided with a plurality of circular rings whose number is the same as the number of the cylindrical columns and whose positions are corresponding to the positions of the cylindrical columns, each of the circular rings is sleeved on a corresponding one of the annular steps, the first casing is provided with screw holes whose positions are corresponding to the positions of the bolt holes and whose number is the same as the number of the holt holes, the third casing, the second casing, and the first casing are assembled and held together via bolts.

8. The mobile phone as described in claim 1, wherein:
each of the protrusions comprises a first top surface, each of the convex blocks comprises a second top surface, each of the first grooves comprises a first bottom surface, each of the second grooves comprises a second bottom surface, the first top surface of each of the protrusions is interference fitted with the first bottom surface of the corresponding first groove, the second top surface of each of the convex blocks is interference fitted with the second bottom surface of the corresponding second groove.

9. The mobile phone as described in claim 8, wherein:
each of the protrusions comprises two opposite first sidewalls, a gap is provided between each of the opposite first sidewalls and the corresponding first groove, each convex block also comprises two opposite second sidewalls, another gap is provided between each of the opposite second sidewalls and the corresponding second groove.

10. The mobile phone as described in claim 9, wherein:
the position of each of the protrusions and the position of the corresponding convex block are opposite to each other, the position of each of the first grooves and the position of the corresponding second groove are opposite to each other, a divider is further provided between each of the first grooves and the corresponding second groove, each protrusion and the corresponding convex block cooperatively press against the divider to form an interference fit.

11. The mobile phone as described in claim 10, wherein:
the first casing and the second casing are further respectively provided with at least four first positioning columns and at least four second positioning columns at opposite left and right sides of the mobile phone, the second casing is provided with a plurality of first positioning holes corresponding to the first positioning columns and a plurality of second positioning holes corresponding to the second positioning columns, each of the first positioning columns is assembled together with a corresponding one of the first positioning holes, and simultaneously each of the second positioning columns is assembled together with a corresponding one of the second positioning holes.

12. The mobile phone as described in claim 11, wherein:
the third casing is further provided with at least four protruding cylindrical columns at opposite left and right sides of the mobile phone, each of the cylindrical columns defines a bolt hole, each of the cylindrical columns further comprises an annular step, the second casing is provided with a plurality of circular rings whose number is the same as the number of the cylindrical columns and whose positions are corresponding to the positions of the cylindrical columns, each of the circular rings is sleeved on a corresponding one of the annular steps, the first casing is provided with screw holes whose positions are corresponding to the positions of the bolt holes and whose number is the same as the number of the holt holes, the third casing, the second casing, and the first casing are assembled and held together via bolts.

13. The mobile phone as described in claim 9, wherein:
the first casing and the second casing are further respectively provided with at least four first positioning columns and at least four second positioning columns at opposite left and right sides of the mobile phone, the second casing is provided with a plurality of first positioning holes corresponding to the first positioning columns and a plurality of second positioning holes corresponding to the second positioning columns, each of the first positioning columns is assembled together with a corresponding one of the first positioning holes, and simultaneously each of the second positioning columns is assembled together with a corresponding one of the second positioning holes.

14. The mobile phone as described in claim 13, wherein:
the third casing is further provided with at least four protruding cylindrical columns at opposite left and right sides of the mobile phone, each of the cylindrical columns defines a bolt hole, each of the cylindrical columns further comprises an annular step, the second casing is provided with a plurality of circular rings whose number is the same as the number of the cylindrical columns and whose positions are corresponding to the positions of the cylindrical columns, each of the circular rings is sleeved on a corresponding one of the annular steps, the first casing is provided with screw holes whose positions are corresponding to the positions of the bolt holes and whose number is the same as the number of the holt holes, the third casing, the second casing, and the first casing are assembled and held together via bolts.

15. The mobile phone as described in claim 8, wherein:
the first casing and the second casing are further respectively provided with at least four first positioning columns and at least four second positioning columns at opposite left and right sides of the mobile phone, the second casing is provided with a plurality of first positioning holes corresponding to the first positioning columns and a plurality of second positioning holes corresponding to the second positioning columns, each of the first positioning columns is assembled together with a corresponding one of the first positioning holes, and simultaneously each of the second positioning columns is assembled together with a corresponding one of the second positioning holes.

16. The mobile phone as described in claim 15, wherein:
the third casing is further provided with at least four protruding cylindrical columns at opposite left and right sides of the mobile phone, each of the cylindrical columns defines a bolt hole, each of the cylindrical columns further comprises an annular step, the second casing is provided with a plurality of circular rings whose number is the same as the number of the cylindrical columns and whose positions are corresponding to the positions of the cylindrical columns, each of the circular rings is sleeved on a corresponding one of the annular steps, the first casing is provided with screw holes whose positions are corresponding to the positions of the bolt holes and whose number is the same as the number of the holt holes, the third casing, the second casing, and the first casing are assembled and held together via bolts.

17. The mobile phone as described in claim 1, wherein:
the first casing and the second casing are further respectively provided with at least four first positioning columns and at least four second positioning columns at opposite left and right sides of the mobile phone, the second casing is provided with a plurality of first positioning holes corresponding to the first positioning columns and a plurality of second positioning holes corresponding to the second positioning columns, each of the first positioning columns is assembled together with a corresponding one of the first positioning holes, and simultaneously each of the second positioning columns is assembled together with a corresponding one of the second positioning holes.

18. The mobile phone as described in claim 17, wherein:
the third casing is further provided with at least four protruding cylindrical columns at opposite left and right sides of the mobile phone, each of the cylindrical columns defines a bolt hole, each of the cylindrical columns further comprises an annular step, the second casing is provided with a plurality of circular rings whose number is the same as the number of the cylindrical columns and whose positions are corresponding to the positions of the cylindrical columns, each of the circular rings is sleeved on a corresponding one of the annular steps, the first casing is provided with screw holes whose positions are corresponding to the positions of the bolt holes and whose number is the same as the number of the holt holes, the third casing, the second casing, and the first casing are assembled and held together via bolts.

* * * * *